United States Patent

[11] 3,581,174

[72] Inventor Dale F. Hammer
 Bellbrook, Ohio
[21] Appl. No. 870,628
[22] Filed Dec. 15, 1969
[45] Patented May 25, 1971
[73] Assignee General Motors Corporation
 Detroit, Mich.

[54] AUTOMATIC REVERSING CIRCUIT FOR A WINDOW REGULATOR MOTOR CONTROL SYSTEM
 2 Claims, 2 Drawing Figs.

[52] U.S. Cl. .................................................. 318/266,
 318/285, 318/297, 318/466
[51] Int. Cl. ..................................................... H02p 1/22
[50] Field of Search ............................................ 318/266,
 296, 297, 285, 466

[56] References Cited
 UNITED STATES PATENTS
 3,513,374 5/1970 Koment ......................... 318/266

Primary Examiner—Oris L. Rader
Assistant Examiner—K. L. Crosson
Attorneys—E. W. Christen, C. R. Meland and Robert W. Smith ABSTRACT: A window regulator motor control system for a drive motor operative to open and close a window includes an automatic reversing circuit incorporating an overload current relay and a reversing relay which function to reverse the motor in response to an overload current condition. The reversing relay is energized through a controlled rectifier gated conductive by a triggering circuit including a resistance-capacitance time delay network connected to the overload current relay. When the window is driven against an obstruction, the time delay network provides a momentary delay before the controlled rectifier is gated conductive and the motor is reversed.

PATENTED MAY 25 1971

3,581,174

INVENTOR.
Dale F. Hammer
BY
Robert W. Smith
ATTORNEY

AUTOMATIC REVERSING CIRCUIT FOR A WINDOW REGULATOR MOTOR CONTROL SYSTEM

This invention relates to motor driven window regulators and more particularly to a motor control system including a reversing circuit responsive to an obstacle impeding movement of the window regulator.

The use of remotely controlled and power assisted devices are now commonplace in automotive vehicles and in particular electrically powered window regulators are more frequently found among the accessory items included in automobiles. Operation of remotely controlled automobile windows can include instances of a window engaging an obstruction without the knowledge of the operator. This may occur, for example, when an occupant in a forward compartment closes a window in a rearward compartment. In the case of a window being driven against an obstructing object for an extended time, possible damage can occur to the window regulator mechanism or to the motor as a result of increased motor current which develops because rotation of the motor is blocked.

In accordance with the present invention, a remotely controlled window is automatically retracted in response to an obstruction impeding closure of the window by incorporating an improved automatic reversing circuit in the window regulator motor control system. More specifically, an overload current relay and a reversing relay are provided to switch the motor so as to open the window in response to an overload current condition. The reversing relay includes relay contacts connected to the motor so as to bypass the normal motor power circuit. A semiconductor controlled rectifier energized the reversing relay and is gated conductive by a triggering circuit connected to switch contacts of the overload relay. The triggering circuit includes a resistance-capacitance time delay network having a capacitor which begins charging when the switch contacts close in response to motor overload current developed when the window is being closed. Voltage developed across the capacitor renders the controlled rectifier conductive after a momentary time delay as determined by the time constant of the time delay network. The controlled rectifier energizes the reversing relay and the relay contacts close to interrupt the motor current and reconnect the motor for reverse rotation. The window is driven open to free the obstruction imposed on the operation of the window regulator and to eliminate the overload current condition.

Accordingly, an object of the present invention is to provide an improved automatic reversing circuit arrangement for a window regulator drive motor in which simple and reliable circuit components are easily incorporated in a window regulator motor control system so as to reverse the rotation of the drive motor in response to an overload current condition.

A further object of this invention is to provide an automatic reversing circuit for a window regulator drive motor having two field windings wherein an overload relay senses the current in one of the field windings and a series circuit including a controlled rectifier energizes a relay coil of a reversing relay having contacts operative to interrupt the current in the one field windings and to energize the other field winding and further, a triggering circuit connected between switch contacts of the overload current relay and the controlled rectifier gates the latter conductive so as to energize the reversing relay after a predetermined delay period thereby avoiding reversing of the motor in response to instantaneous surges of high current.

Further objects and advantages of the present invention will be apparent from the following description, reference being had to the accompanying drawing wherein a preferred embodiment of the present invention is shown.

Figure 1:
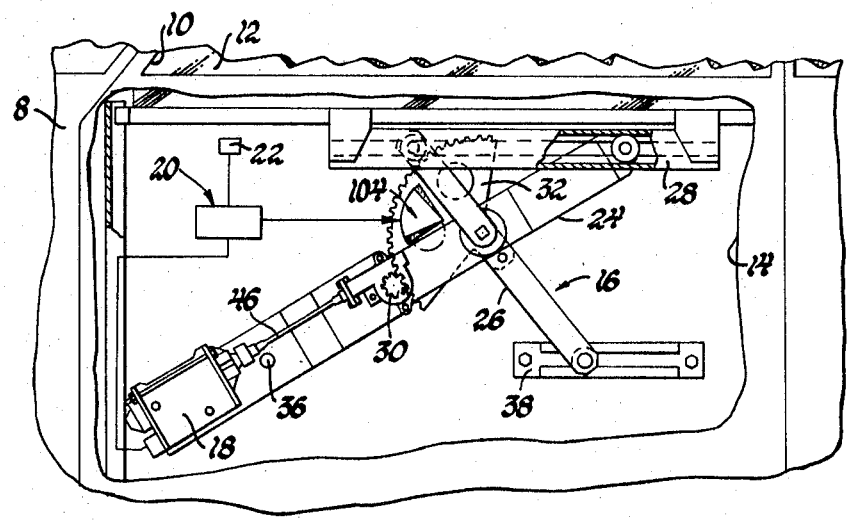
FIG. 1 is a partial side elevational view of an automotive vehicle body illustrating a window regulator actuated by a window regulator motor control system including the automatic reversing circuit of this invention.
Figure 2:
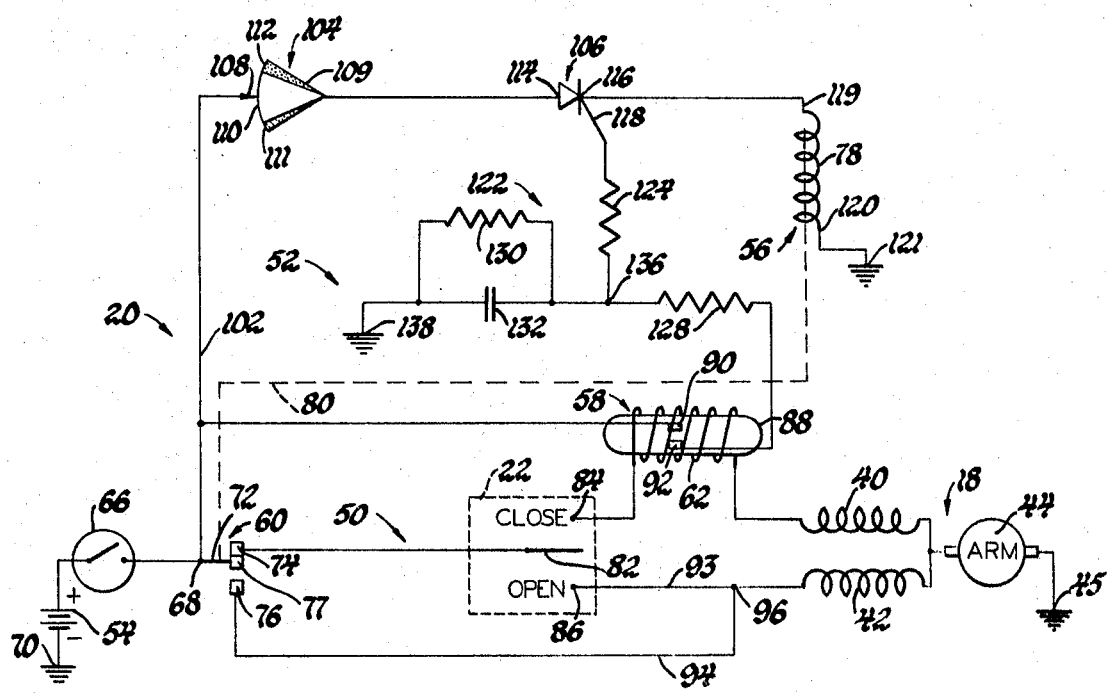
FIG. 2 is a schematic electrical diagram of the window regulator motor control system and the automatic reversing circuit of this invention.

Referring to FIG. 1 of the drawing, there is shown an automotive vehicle body 8 with a window opening 10 including a window closure member provided by a movable window 12 which is retractable into a hollow body section 14. A window regulator 16 mounted in the body section 14 moves the window 12 between the closed and open positions. An electric drive motor 18 powers the window regulator 16 in accordance with operation of a window regulator motor control system 20. A manually operated switch 22, accessible to an occupant of the vehicle body 8, provides remotely controlled operation of the motor control system 20 as described hereinbelow in connection with description of FIG. 2.

The window regulator 16 includes a linkage mechanism corresponding to that disclosed in U.S. Pat. No. 3,069,152, issued Dec. 18, 1962 and assigned to the assignee of this invention, which is illustrative of a suitable window regulator mechanism adapted to be powered by motor drive means such as the motor 18. The linkage mechanism generally includes a pair of pivot arms 24 and 26 having upper ends connected to the window 12 by a slotted channel 28. The motor 18 is drivingly connected to the window regulator 16 through a gear arrangement including a pinion gear 30 and a sector gear 32 fixedly mounted on the arm 26. The motor 18 is mounted on the lower end of the arm 24 which pivots about a fixed pivot point 36. The arm 26 has a lower end slidably mounted to the vehicle body by a cam channel 38.

The motor 18 is a series type direct current motor including a first field winding 40, a second field winding 42, and an armature 44. The motor circuit includes the field windings 40 and 42 connected in separate series circuits with the armature 44 which is externally connected to a source of reference potential at a grounded connection 45. A rotatable motor shaft 46 associated with the armature 44 is operatively connected to the pinion gear 30. The field windings 40 and 42 are selectively energizable to rotate the motor shaft 46 clockwise and counterclockwise so at to raise and lower, respectively, the window 12.

THe motor control system 20 includes a motor power circuit 50 and an automatic reversing circuit 52 provided by the present invention. The power circuit 50 includes the manually operated switch 22 connected between the motor 18 and a source of direct current voltage provided by a battery 54. The automatic reversing circuit 52 includes reversing relay 56 and an overload current relay 58 respectively including a reversing relay contact assembly 60 and a current relay winding 62, both connected in the power circuit 50 as described hereinbelow.

THe battery 54 has the positive pole thereof connected through an ignition switch 66 to a circuit junction 68 to supply both the power circuit 50 and the automatic reversing circuit 52. The negative pole of the battery 54 is connected to the reference potential at a grounded connection 70.

The power circuit 50 is connected to the junction 68 by the contact assembly 60 of the reversing relay 56. The contact assembly 60 includes a movable contact arm 72, a normally closed contact 74 and a normally open contact 76. The arm 72 includes common contact 77 which engages the normally closed contact 74 when a relay coil 78 included in the reversing relay 56 is deenergized. The contact arm 72 is connected to the circuit junction 68 and is operated by an armature 80 movable in response to energization of the relay coil 78 to disengage the contact 74 and engage the contact 77 with the contact 76.

The manually operated switch 22 is connected between the normally closed contact 74 and the motor 18 to selectively energize the field windings 40 and 42. A switch lever 82 is movable between two positions to engage contacts 84 and 86. The contact 84 is designated "Close" and is connected with the field winding 40 and the contact 86 is designated "Open" and is connected with the field winding 42. The switch lever 82 is normally biased intermediate the contacts 84 and 86 so that the motor is not energized until the switch lever 82 contacts either of the contacts 84 or 86.

The winding 62 provided in the overload current relay 58 is connected intermediate the contact 84 and the field winding 40. The winding 62 is current sensitive and is responsive to excessive or high current levels conducted through the field winding 40. The switch contact assembly 88 of the overload current relay 58 includes normally open contacts 90 and 92 of a reed switch inductively coupled with the winding 62. In a preferred embodiment the winding 62 is wound around the reed switch so that the magnetic field developed by the winding 62 draws the contacts 90 and 92 together when the current through the winding 62 reaches a predetermined level.

The field winding 42 is connected by a conductor 93 to the contact 86 of the manually operated switch 22. The field winding 42 is also connected to the normally open contact 76 of the relay contact assembly 60 by a conductor 94 at a circuit junction 96 formed with the conductor 93. The contact 76 and the conductor 94 provide a path which bypasses the manually operated switch 22 so that the field winding 42 is energized directly from the battery 54 when the contact arm 72 engages the contact 76.

The motor power circuit 50 described hereinabove is rendered operative when the ignition switch 66 is closed to connect the switch lever 82 of the switch 22 through the normally closed contact 74 of the relay contact assembly 60. The manually operated switch 22 is then operable to apply battery voltage across either of the field windings 40 or 42 and the armature 54 when the switch lever 82 is placed in the "Close" or "Open" positions.

Referring now to the automatic reversing circuit 52, the reversing relay 56 is energized through a series circuit comprising conductor 102 connected to the junction 68, a limit switch 104, and a controlled rectifier 106 connected between limit switch 104 and the reversing relay coil 78. The limit switch 104 includes a stationary contact 108 and a movable contact member 109. The contact member 109 engages the stationary contact 108 and includes conductive contact surface 110 located between two nonconductive contact surfaces 111 and 112. The contact member 109 is mounted in a suitable location for movement with the window 12, for example, on the sector gear 32. Therefore, the conductive surface 110 and nonconductive surfaces 111 and 112 are moved relative to the stationary contact 108 as the window regulator 16 operates between raised and lowered window positions. The nonconductive surfaces 111 and 112 engage the contact 108 when the window is within approximately one-half inch of the raised and lowered positions, respectively.

The controlled rectifier 106 is a semiconductor switching device of the silicon controlled rectifier (SCR) type having anode 114, cathode 116, and gate 118 electrodes. The anode 114 is connected to the movable contact member 109 of the limit switch 104. The cathode 116 is connected to the upper end 119 of the relay coil 78. The series circuit of the relay coil 78 is completed by connecting the lower end 120 of the relay coil 78 to a grounded connection 121. The gate 118 of the controlled rectifier 106 is connected to a triggering circuit 122 operative to bias the controlled rectifier 106 conductive.

The triggering circuit 122 includes a current limiting resistor 124 and a time delay network formed by a resistor 128 and a resistor 130 connected in parallel with a capacitor 132. The resistor 124 is connected between the gate 118 and a circuit junction 136 which is formed between one of common ends of the resistor 130 and the capacitor 132 and one end of the resistor 128. The other of the common ends of the resistor 130 and the capacitor 132 is connected to the reference potential provided at a grounded connection 138. The triggering circuit 122 is completed by connecting the remaining end of the resistor 128 to contact 92 of the switch contact assembly 88 and connecting the contact 90 to a circuit junction 142 formed with the conductor 102. Thus connected, the triggering circuit 122 is connected across the battery 54 when the contacts 90 and 92 are closed by the relay winding 62. When the potential at the circuit junction 136 applies the critical triggering voltage across the gate 118 and the cathode 116, the controlled rectifier 106 is gated conductive in accordance with the well known characteristics of a semiconductor controlled rectifier.

The time delay network provided by the resistor 128 and the parallel connected resistor 130 and the capacitor 132 has a predetermined resistance-capacitance (RC) time constant to keep the gating of the controlled rectifier 106 insensitive to an instantaneous closing of the contacts 90 and 92. This may occur, for example, when the field winding 40 is initially energized and an instantaneous surge of starting current occurs. The surge of starting current is sufficient to cause the relay winding 62 to momentarily close the contacts 90 and 92. It has been found that a surge of starting current exists for approximately 0.1 second. Accordingly, the RC time constant of the time delay network has a predetermined value such that 0.2 second is required before the capacitor 132 is charged sufficiently to develop a voltage at the junction 136 to render the controlled rectifier 106 conductive. Thus, a high current level must flow through the relay winding 62 for at least 0.2 second in order to render the controlled rectifier 106 conductive and energize the reversing relay coil 78.

During normal operation of the window actuator 16, the switch lever 82 is moved to the "Close" position to energize the field winding 40 from the series circuit including the battery 54, the ignition switch 66, the normally closed contact 74, the contact 84 and the relay winding 62. The motor shaft 46 is rotated clockwise to drive the window regulator 16 to a window raised or closed position. To lower the window 12, the switch lever 82 is placed in the "Open" position to engage the contact 86 and energize the field winding 42 as described for the field winding 40.

During the window raising mode of operation, an object in the window opening 10 can block further closing of the window 12. The current supplied to the field winding 40 increases because the motor shaft 46 is stopped since the torque on the shaft exceeds the output of the motor 18. As the current through the first field winding 40 begins to reach the overload or stalled condition, the current through the relay coil 62 develops a magnetic field sufficient to close the contacts 90 and 92. The time delay network is then connected across the battery 54 and the capacitor 132 charges in accordance with the aforementioned RC time constant provided by the resistances of resistors 128 and 130 and the capacitance of the capacitor 132. The voltage at the circuit junction 136 rises so that the critical firing voltage of the controlled rectifier 106 is reached after the predetermined time delay of 0.2 second. The current limiting resistor 124 limits the current applied to the gate 118 to a safe value so as to prevent damage to the controlled rectifier 106.

The controlled rectifier 106 in the conductive state provides a low resistance path between the anode 114 and cathode 116. Accordingly, the reversing relay winding 78 is connected across the battery 54. The limit switch 104 will be positioned so that the conductive surface 110 engages stationary contact 108 and provides a closed circuit path. Upon energization of the reversing relay coil 78, the contact arm 72 is moved by the armature 80 to engage the normally open contact 76. This interrupts the power circuit energizing the field winding 40 and the overload current condition in the motor 18 is removed. The electromagnetic field of the relay coil 62 collapses and the associated switch contacts 90 and 92 are opened. Thus, the triggering circuit 122 is disconnected from the battery 54 although the controlled rectifier 106 continues conducting in accordance with the conventional characteristics of a controlled rectifier. Voltage stored on the capacitor 132 will drain off through the resistor 130 to ground, discharging the capacitor 132.

Upon closing of the contact arm 72 with the normally open contact 76, the field winding 42 is connected to the battery 54. The conductor 94 extending between the normally open contact 76 and the circuit junction 94 bypasses the manually operated switch 22. Therefore, regardless of the position of the switch lever 82 and field winding 42 continues to be energized.

Energization of the field winding 42 causes the armature 44 to be rotated counterclockwise driving the window regulator 16 to lower the window 12 toward its opened position. Continued lowering of the regulator 16 rotates the conductive surface 110 of the limit switch 104 until the nonconductive portion 112 engages the fixed contact 108. The series circuit including the controlled rectifier 106 and the reversing relay winding 78 is interrupted to render the controlled rectifier 106 nonconductive and deenergize the relay coil 78. The contact arm 72 is released and returns to engage the normally closed contact 74. The controlled rectifier 106 is switched nonconductive by interrupting the voltage across the anode to cathode and it remains nonconductive until the anode to cathode voltage is reapplied and a triggering voltage is applied to the gate 118.

If the manually operated switch lever 82 has been released, the window 12 will remain in the opened position. If the switch lever 82 is placed in the "Close" position, the circuit for energizing the first field winding 40 is again operable to drive the window 12 toward the closed position. As the window closes, the limit switch 104 is rotated so that the nonconductive surface 111 engages the fixed contact 108. Thus, the automatic reversing circuit 52 of this invention is disconnected and inoperative when the window 12 is in either the opened or closed position. Any overload current that may be developed by continuing to energize the windings 40 and 42 from the switch 22 does not activate the reversing circuit after the closing and opening operations are completed.

From the foregoing description it is apparent that the invention provides a simple and effective means for preventing damage to the motor 18 or the window regulator 16 caused by obstruction preventing the movement of the window 12. The automatic reversal of the motor 18 prevents motor current from reaching an overload level for an extended time after the motor is stopped by an obstruction. The circuit elements comprising the automatic reversing circuit 52 may be easily and compactly mounted within a hollow body portion of an automotive vehicle as found in a door for example.

While the embodiment of the present invention as herein disclosed constitutes a preferred from it is understood that other forms may be adopted within the scope of this invention.

What I claim is as follows:

1. A motor control system for regulating the operation of a window closure member in combination with an electrical power source; a motor including an armature, a first field winding for rotating said armature in one direction when energized by said electrical power source, and a second field winding for rotating said armature in the opposite direction when energized by said electrical power source; and a window regulator mechanism connected to said armature and to said window closure member for moving the window closure member to a closed position in response to rotation of said armature in said one direction and moving the window closure member to an open position in response to the rotation of said armature in said opposite direction; wherein said motor control system comprises: a motor power circuit including at least one electrical switch operable to a first position for connecting said armature and said first field winding across said electrical power source and operable to a second position for connecting said armature and said second field winding across said electrical power source; a reversing relay including a relay coil and a contact assembly connected in said motor power circuit for connecting said electrical switch and said motor across said electrical power source while said relay coil is deenergized and for connecting only said armature and said second field winding across said electrical power source when said relay coil is energized; a reversing circuit connected between said electrical power source and said relay coil including a controlled rectifier having two current carrying electrodes connected in series with said relay coil and said electrical power source, and a gate electrode for energizing said relay coil in response to the application of a trigger signal to said gate electrode; a triggering circuit connected to said gate electrode of said controlled rectifier for applying a trigger signal to said gate electrode when the triggering circuit is energized; an overload current relay including a relay winding and a normally open switch assembly; means connecting said relay winding in said motor power circuit in a current sensing relationship with said first field winding so that said normally open switch assembly is closed in response to an overload current developed in said first field winding; means connecting said normally open switch assembly and said triggering circuit across said electrical power source whereby said triggering circuit is energized when said normally open switch assembly is closed; and a time delay network included in said triggering circuit for delaying the application of a trigger signal to said gate electrode for a predetermined time period after said triggering circuit is energized whereby said reversing circuit is insensitive to instantaneously developed high current surges through said first field winding.

2. A motor control system for regulating the operation of a window closure member in combination with an electrical power source; a motor including an armature, a first field winding for rotating said armature in one direction when energized by said electrical power source, and a second field winding for rotating said armature in the opposite direction when energized by said electrical power source; and a window regulator mechanism connected to said armature and to said window closure member for moving the window closure member to a closed position in response to rotation of said armature in said one direction and moving the window closure member to an open position in response to the rotation of said armature in said opposite direction; wherein said motor control system comprises: a motor power circuit including at least one electrical switch operable to a first position for connecting said armature and said first field winding across said electrical power source and operable to a second position for connecting said armature and said second field winding across said electrical power source; a reversing relay including a relay coil and a contact assembly connected in said motor power circuit for connecting said electrical switch and said motor across said electrical power source while said relay coil is deenergized and for connecting only said armature and said second field winding across said electrical power source when said relay coil is energized; a reversing circuit including a limit switch having a fixed contact and a movable contact operatively coupled to movement of said window closure member, a controlled rectifier having two current carrying electrodes connected in series with said fixed contact and said movable contact, and connecting said reversing relay coil across said electrical power source, the contacts of said limit switch having an open contact position in response to said window closure member being in one of the open or closed positions and a closed contact position over intermediate positions between said open or closed positions, said controlled rectifier further having a gate electrode for energizing said relay coil when said limit switch is in the closed position in response to the application of a trigger signal to said gate electrode; a triggering circuit connected to said gate electrode of said controlled rectifier for applying a trigger signal to said gate electrode when the triggering circuit is energized; an overload current relay including a relay winding and a normally open switch assembly; means connecting said relay winding in said motor power circuit in a current sensing relationship with said first field winding so that said normally open switch assembly is closed in response to an overload current developed in said first field winding; means connecting said normally open switch assembly and said triggering circuit across said electrical power source whereby said triggering circuit is energized when said normally open switch assembly is closed; and a time delay network connected in said trigger circuit including a first resistor, a second resistor connected in series with said first resistor and a capacitor connected across said second resistor, said time delay network having a predetermined time constant for delaying the application of a trigger signal to said gate electrode for a predetermined time period after the triggering circuit is energized whereby said reversing circuit is insensitive to instantaneously developed high current surges occurring in said first field winding.